(No Model.) 4 Sheets—Sheet 1.

J. H. GREEFKENS.
CASH REGISTERING SAVINGS BANK.

No. 537,449. Patented Apr. 16, 1895.

Witnesses:

Inventor
J. H. Greefkens
By James J. Sheehy
Attorney

THE NORRIS PETERS CO., PHOTO-LITHO., WASHINGTON, D. C.

(No Model.) 4 Sheets—Sheet 2.
J. H. GREEFKENS.
CASH REGISTERING SAVINGS BANK.

No. 537,449. Patented Apr. 16, 1895.

Witnesses:
Inventor
J. H. Greefkens
By James J. Shuhy
Attorney (No model.) 4 Sheets—Sheet 3.

J. H. GREEFKENS.
CASH REGISTERING SAVINGS BANK.

No. 537,449. Patented Apr. 16, 1895.

Witnesses:

Inventor
J. H. Greefkens.
By James J. Sheehy
Attorney (No Model.) 4 Sheets—Sheet 4.

J. H. GREEFKENS.
CASH REGISTERING SAVINGS BANK.

No. 537,449. Patented Apr. 16, 1895.

Witnesses:

Inventor
J. H. Greefkens
By James J. Sheehy
Attorney

THE NORRIS PETERS CO., PHOTO-LITHO., WASHINGTON, D. C.

UNITED STATES PATENT OFFICE.

JOHN HUBERT GREEFKENS, OF SAN FRANCISCO, CALIFORNIA.

CASH-REGISTERING SAVINGS-BANK.

SPECIFICATION forming part of Letters Patent No. 537,449, dated April 16, 1895.

Application filed April 24, 1894. Serial No. 508,858. (No model.)

*To all whom it may concern:*

Be it known that I, JOHN HUBERT GREEF-KENS, a subject of the King of Belgium, residing at San Francisco, in the county of San Francisco and State of California, have invented certain new and useful Improvements in Cash-Registering Savings-Banks; and I do declare the following to be a full, clear, and exact description of the invention, such as will enable others skilled in the art to which it appertains to make and use the same.

My invention relates to improvements in registering savings banks, and it is designed more particularly as an improvement upon the bank disclosed in my application filed April 21, 1894, Serial No. 508,472, which bank embodies mechanism capable of correctly registering silver coins of various denominations and nickels, when the same are deposited, and is adapted to register up to five dollars.

The general object of my present invention is to provide a registering savings bank capable of correctly registering copper cents as well as "nickels" and silver coins, of various denominations, when the same are deposited.

Another object of the present invention is to provide a registering bank of the same class as that disclosed in my aforesaid application adapted to register up to ten dollars; and still another object is to provide such a registering bank embodying mechanism adapted to prevent a false register and premature discharge of the coin, in case the operator should release the register or hand lever before depressing the same its full extent.

Other objects and advantages of the invention will be fully understood from the following description and claims when taken in connection with the annexed drawings, in which—

Figure 1:
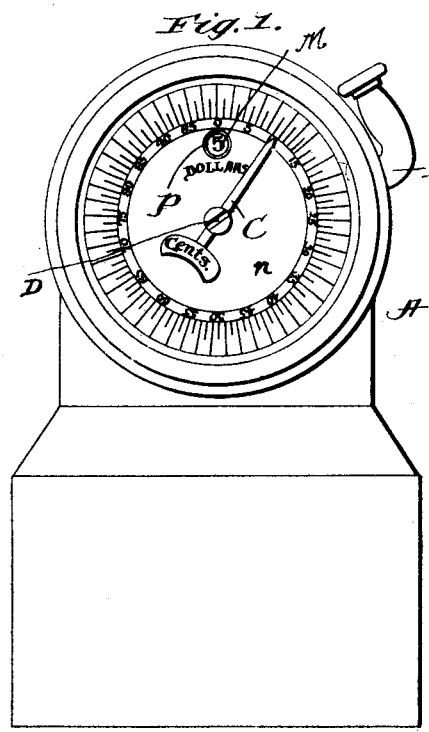
Figure 2:
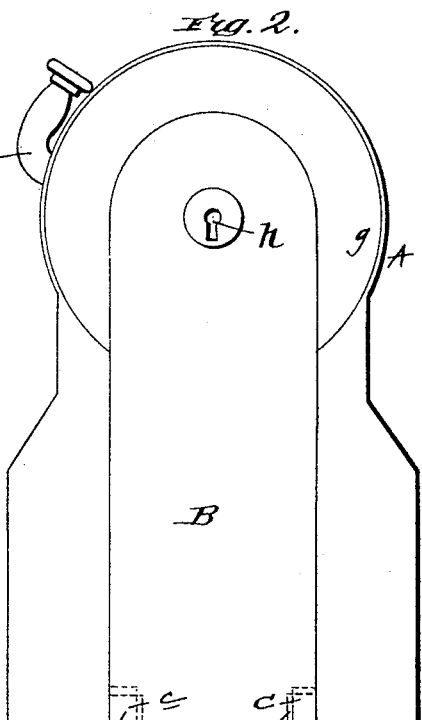
Figure 3:
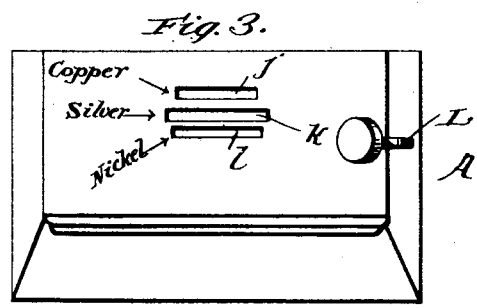
Figure 4:
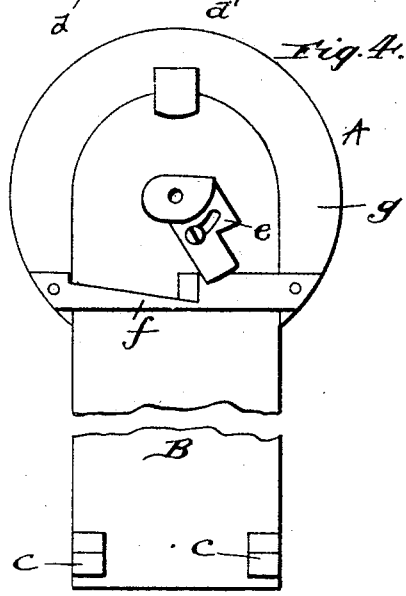
Figure 5:
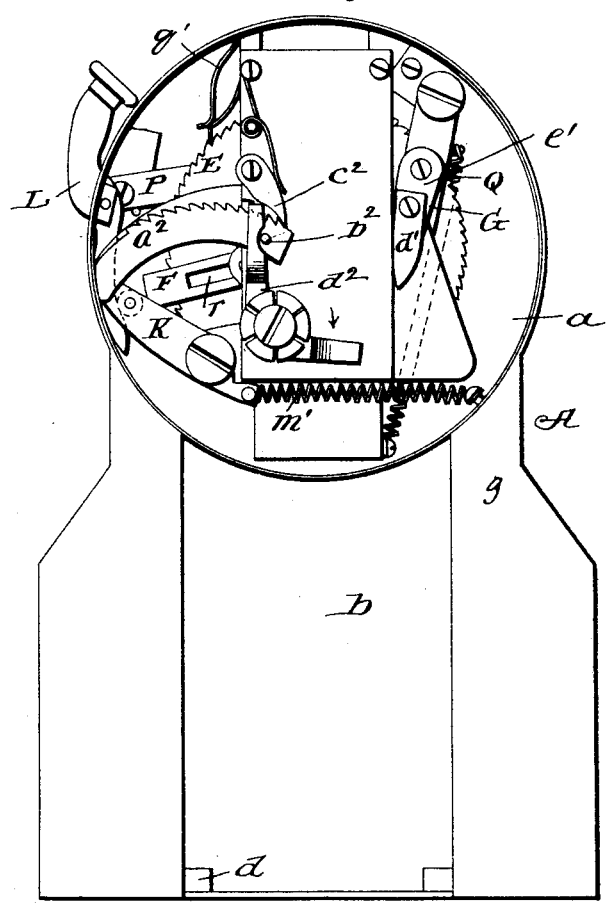
Figure 6:
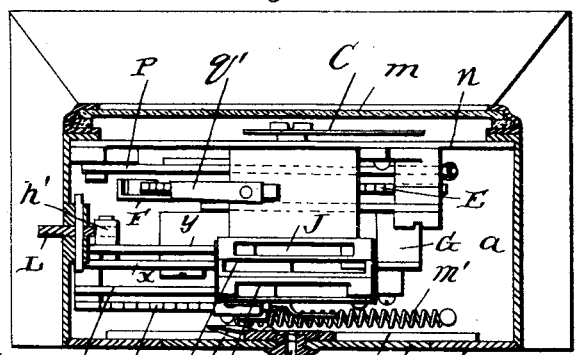
Figure 7:
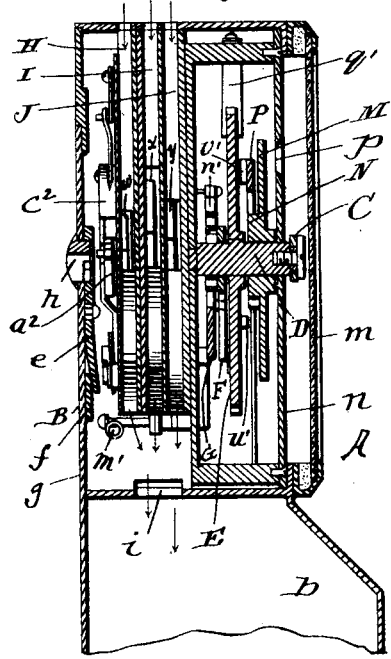
Figure 8:
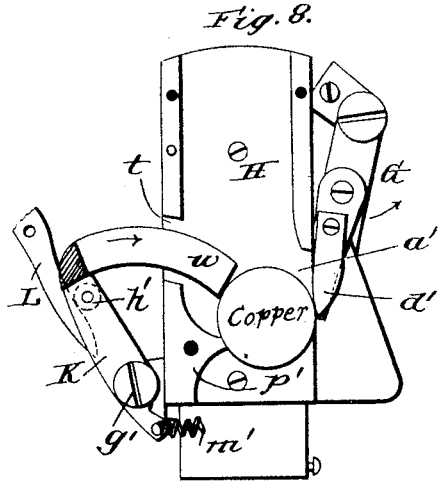
Figure 9:
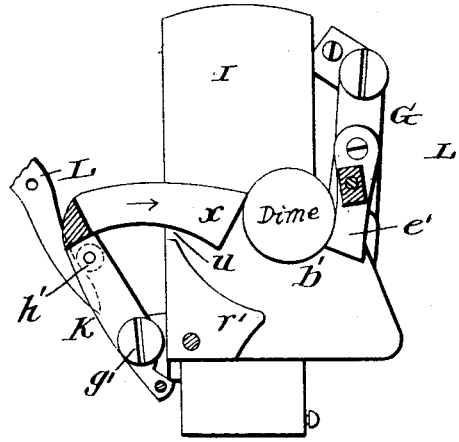
Figure 10:
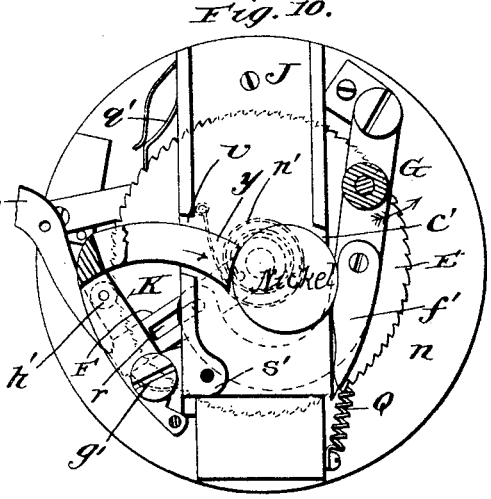
Figure 11:
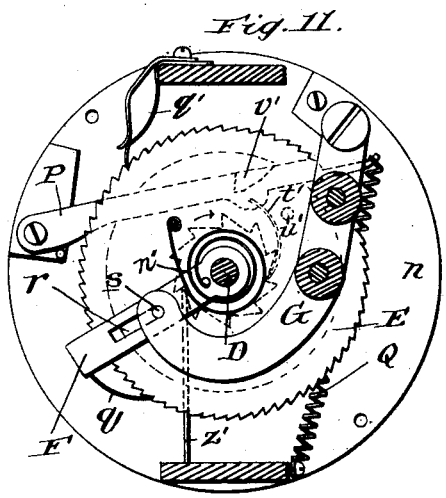
Figure 12:
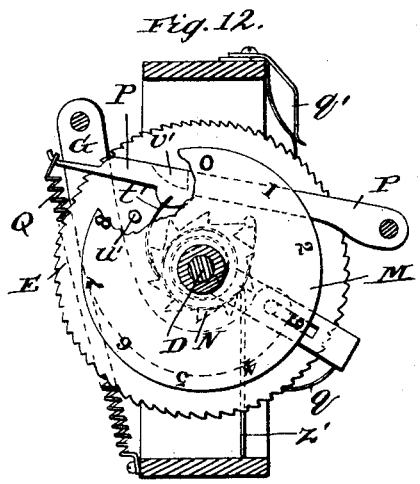
Figure 13:
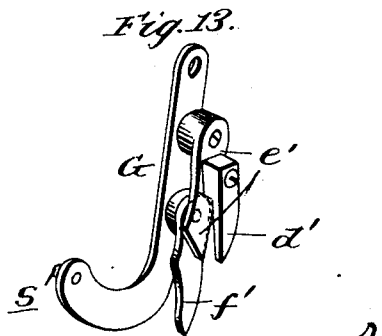
Figure 14:
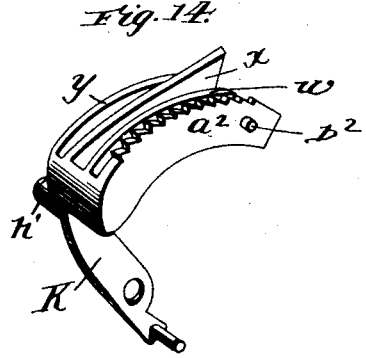
Figure 15:
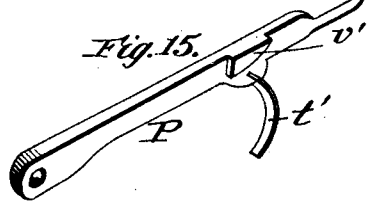
Figure 16:

Figure 1 is a front elevation of my improved registering bank. Fig. 2 is a rear elevation of the same. Fig. 3 is a top plan view. Fig. 4 is an elevation of the inner side of the door and a portion of the rear wall of the casing. Fig. 5 is an enlarged rear elevation with the rear wall of the casing and the door removed. Fig. 6 is a plan view with the casing in section. Fig. 7 is a longitudinal, central sectional view. Fig. 8 is a detail view illustrative of the means by which a copper cent effects connection between the pushing lever and the lever connected with the pointer. Fig. 9 is a similar view showing how a dime effects such connection. Fig. 10 is a detail view showing how a "nickel" effects the connection between the two levers. Figs. 11 and 12 are detail sections. Fig. 13 is a perspective view of the lever connected with the pointer. Fig. 14 is a perspective view of the pushing lever. Fig. 15 is a perspective view of the lever through the medium of which the dollar registering wheel or dial is moved; and Fig. 16 is a perspective view of the bell-crank lever through the medium of which the pushing lever is released so as to allow it to return to its normal position after having been depressed the full extent.

Referring by letter to said drawings:—A, indicates the casing of my improved bank which preferably comprises an upper circular compartment $a$, designed to contain the registering mechanism, and a lower compartment $b$, designed to receive the money, and B, indicates the door. This door B, might be held in its closed position by mechanism such as disclosed in my aforesaid application, but I have here shown it as provided with lugs $c$, designed to engage projections $d$, upon the bottom of the casing, and with a pivoted latch $e$, designed to engage a beveled keeper bar $f$, on the rear wall $g$, of the casing A which latch is designed to be moved through the medium of a key introduced through the slot $h$, so as to lock or unlock the door.

The upper compartment $a$, of the casing A, is connected with the lower compartment $b$, by the opening $i$, (see Fig. 7,) and said upper compartment communicates with the copper, silver, and nickel slots $j$, $k$, and $l$, and is provided with a glass face $m$, and with a dial $n$, as shown. This dial $n$, is provided with an opening $p$, so as to expose the dollar-indicating figures on the dollar disk M, and is preferably divided into one hundred divisions and has each fifth division properly numbered as illustrated so as to enable the pointer C, to register cents, nickels, and silver pieces as will be presently described. The said pointer C, is fixed on a rotary spindle or shaft D, and on said spindle or shaft is also fixed the ratchet wheel E, which has one hundred teeth in accordance with the number of divisions on the dial and is designed to be engaged by and moved through the medium of the lever F.

See Fig. 11. This lever F, is fulcrumed on the spindle or shaft D, and it has a pawl q, engaging the ratchet wheel E, and is provided with a slot as r, to receive the stud s, of the coin engaging lever from which it receives its movement as will be presently understood.

H, I, and J, indicate the "copper," "nickel," and "silver" chutes which communicate with and depend from the slots j, k, and l, as shown. These chutes H, I, and J, are provided in one of their sides with openings t, u, v, for the passage of the coin engaging portions w, x, y, of the pushing lever K, and in their opposite sides with openings a', b', and c', for the passage of the coin engaging portions d', e', f', of the lever G.

The pushing lever K, is fulcrumed at a point intermediate of its length as shown at g', and is provided with a projection h', for the engagement of the hand or registering lever L; and the lever G, is fulcrumed at one end and has its outer portion curved as illustrated in Fig. 11.

I prefer to employ the curved lever G, and the lever F, instead of the single lever I disclosed in my aforesaid prior application, as when the two levers are employed, a quarter rotation of wheel E, and pointer C, (which is necessary to register a quarter) may be effected and at the same time the parts may be arranged within a small compass which is a desideratum.

The hand lever L, and the pushing lever K, are held in and returned to their normal positions by the action of the coiled spring m', which is connected to the lever K, and the casing; and the lever F, and consequently the lever G, are held in and returned to their normal positions by the spring n', (see Fig. 11,) which is connected at one end to the lever F, and at its opposite end to a stationary plate of the mechanism frame.

By reason of the construction thus far described it will be seen that when a copper cent is deposited in the slot j, it will fall down the chute H, and will rest on the seat p' at the lower end of said chute, where it will be held by the portion d', of the lever G in the direction of the arrow. Now when the lever L, is depressed the pushing lever K, will be moved in the direction indicated by the arrow (see Fig. 8), and its portion w, engaging the cent will, through the medium of the same, move the lever G, in the direction indicated by the arrow so as to move the wheel E, one tooth, and the pointer C, the width of one graduation, when the cent will drop from between the levers into the money compartment b, and the levers will return to their normal positions. The wheel E, and the pointer C, will however be held in the position to which they are moved by the detent pawl q', which effectually prevents retrograde movement of the wheel. When a silver piece, a dime for instance, is deposited in the slot k, it will fall down the chute I, and rest on the seat r' at the lower end of the chute I, in a position to be engaged by the portion x, of the lever K, and the portion e', of the lever G, so that when the lever K, is moved into the position shown in Fig. 9, it will, through the medium of the coin, push the lever G, in the direction indicated by the arrow sufficiently far to move the wheel E, ten teeth and the pointer C, the distance of ten graduations. A nickel deposited in the slot l, will fall down the chute J, and rest between the seat s', and the portion f', of the lever G, and when the lever K, is moved in the direction indicated by arrow its portion y, will, through the medium of the "nickel" as shown in Fig. 10, move the lever G in the direction of the arrow, sufficiently far to move the wheel E, the distance of five teeth and the pointer C, five graduations, when the nickel will fall from between the levers.

It will be seen from the foregoing that while separate slots and chutes are provided for the coins of different denominations, a single lever is employed to move the coins and through the medium of the same transmit the proper extent of movement to a single lever connected with the pointer.

The lever G, may for the sake of cheapness be cast or otherwise formed in one piece as may the lever K, and consequently it will be seen that the entire mechanism may be produced very cheaply, so as to permit of the bank being placed on the market as a toy.

Loosely mounted upon the shaft or spindle D, in front of the ratchet wheel E, as better shown in Fig. 12, is a wheel or disk M, which is provided upon its face and at equi-distant points adjacent to its periphery with the figures 0, 1, 2, 3, 4, 5, 6, 7, 8, and 9, which are designed to appear through the opening p, in the dial n, and indicate the number of dollars which have been deposited in the bank. The said wheel or disk M, is fixedly connected to or formed integral with a ratchet wheel N, which has ten teeth; and the said ratchet wheel is designed to be moved through the medium of the lever P, which has a pawl t', in engagement with the teeth of the ratchet and is held in and returned to the position shown in Fig. 11, by the coiled spring Q.

In order to raise the lever P, when the wheel E, has made a complete rotation, I provide the stud u', on the wheel E. This stud is designed to engage the projection v', of the lever P, and raise the said lever, so that when the stud passes the projection, the coiled spring Q, will force the pawl t', into engagement with the tooth above that which it engaged before and will turn the wheel or disk M, sufficiently far to bring a new figure opposite the opening p, in the dial. For instance when the figure 0, is opposite the opening p, and the wheel E, has made a complete or almost complete rotation said wheel E, through the medium of the mechanism described will move the disk M, sufficiently far to bring the figure 1, opposite the opening p, and so on. When the wheel N, has been moved in the direction indicated for the purpose described, retrograde movement of the said wheel or disk will be prevented by the detent $z'$, better illustrated in Figs. 11 and 12.

In order to prevent a person from registering more than the value of a deposited coin, I provide the mechanism better illustrated in Figs. 5 and 14. This mechanism comprises a segmental rack $a^2$, which is connected to or formed integral with the lever K, and has a stud as $b^2$, a spring pressed pawl $c^2$, which is designed to engage the teeth of the rack and prevent retrograde movement of the lever K, and levers L, G, and the bell crank lever $d^2$, which is mounted on a stationary fulcrum $d$, and is designed to raise the pawl out of engagement with the teeth of the rack when the lever K, has been moved the full extent so as to permit the said lever to return to its normal position. The bell crank lever $d^2$, is arranged in the manner shown, and it will be seen that when the lever K, is depressed the full extent, the stud $b^2$, of the segmental rack will engage the lower leg of the lever and will move its upper leg in the direction indicated by an arrow so as to raise the pawl away from the rack and permit the lever K, to resume its normal position. When the lever K, reaches its normal position, the stud $b^2$, will move the upper leg of the lever $d^2$, out of engagement with the pawl so as to permit the same to engage the teeth of the rack and perform its function when the lever K, is again depressed. By reason of the construction just described it is impossible for a person to partially depress the lever L, and then let it come back to its normal position together with the levers K, and G, so as to move the wheel E, a greater number of teeth than the denomination of the coin warrants, inasmuch as the pawl $c^2$, locks the lever K, against retrograde movement until it is moved forwardly the full extent.

It will be seen from the foregoing description taken in connection with the drawings that my improved registering bank is very simple and compact and by reason of the few parts may be manufactured very cheaply. It will also be perceived that through the medium of the mechanism disclosed, a child is enabled to correctly register every coin it deposits.

I have in some respects specifically described the construction and relative arrangement of the several parts of my improved bank in order to impart a full and clear understanding of the same, but I do not desire to be understood as confining myself to such specific construction and arrangement as such changes or modifications may be made in practice as fairly fall within the scope of my invention.

Having described my invention, what I claim is—

1. In a register the combination of three chutes having openings in two of their opposite sides and a pushing lever having three separate coin engaging portions adapted to enter the chutes from one side, a pointer and a lever G, connected by intermediate mechanism with the pointer and having the three separate coin-engaging portions $d'$, $e'$, and $f'$, at its side; said lever G, being adapted to be actuated through the medium of the pushing lever when a coin, deposited in any one of the chutes, rests between the two, substantially as specified.

2. In a register, the combination of a casing, three chutes having openings in two of their opposite sides, a pushing lever having three separate coin-engaging portions adapted to enter the chutes from one side, and also having a projection $h'$, a hand lever extending outside the casing and engaging the projection $h'$, of the pushing lever, a pointer and a lever G, connected by intermediate mechanism with the pointer and having the three separate coin-engaging portions $d'$, $e'$, and $f'$, at its side, substantially as and for the purpose set forth.

3. In a register, the combination of a rotary spindle or shaft, a pointer and a ratchet wheel fixed on said spindle or shaft, a lever F fulcrumed on the spindle or shaft and engaging the ratchet wheel, and a second lever fulcrumed at one end and connected at its opposite end with the first named lever and having a portion at an intermediate point of its length for the engagement of a coin, substantially as specified.

4. In a register, the combination of a rotary spindle or shaft, a pointer and a ratchet wheel fixed on said spindle or shaft, a lever F fulcrumed on the spindle or shaft and engaging the ratchet wheel, and a second lever fulcrumed at one end and having its outer portion curved and connected with the first named lever and also having a portion at an intermediate point of its length for the engagement of a coin, substantially as specified.

5. In a register, the combination of a rotary spindle or shaft, a pointer and a ratchet wheel fixed on said spindle or shaft, a lever fulcrumed on the spindle or shaft and engaging the ratchet wheel, a chute, a lever G, fulcrumed at one end and having its outer portion curved and connected with the first named lever and also having a portion for the engagement of a coin deposited in the chute and a pushing lever adapted through the medium of a coin to move the lever G, substantially as and for the purpose set forth.

6. In a register, the combination of a pushing lever carrying a rack, a pawl engaging the teeth of the rack and adapted to prevent retrograde movement of the pushing lever, and a bell-crank lever adapted when moved by the pushing lever to disengage the pawl from the rack, substantially as and for the purpose set forth.

7. In a register, the combination of a pushing lever carrying a segmental rack provided with a stud $b^2$, a pawl engaging the segmental rack and adapted to prevent retrograde movement of the pushing lever, and a bell crank lever adapted, when engaged by the stud of the segmental rack, to disengage the pawl from said rack, substantially as specified.

8. In a register, the combination of a pointer, a series of three chutes, a lever G, connected by intermediate mechanism with the indicator and having its outer portion curved and provided with three coin-engaging portions, and a pushing lever disposed on the opposite side of the chutes with respect to the lever G, and adapted to transmit motion to said lever G, through the medium of a coin, substantially as specified.

9. In a register, the combination of a rotary spindle or shaft, a dial having an opening as $p$, a pointer and a wheel E, fixed on the spindle or shaft, a wheel or disk M, loosely mounted on the spindle or shaft and having a series of figures on its face, mechanism intermediate of the wheel E, and the disk M, a series of chutes, a lever G, having its outer portion curved and provided with coin-engaging portions, mechanism intermediate of the said lever G, and the wheel E, and a pushing lever adapted to transmit motion to the lever G, when a coin is interposed between the two, substantially as and for the purpose set forth.

10. In a register, the combination of a plurality of chutes, a spindle or shaft carrying a pointer and a ratchet wheel, a lever F, fulcrumed on the spindle or shaft and adapted to engage the ratchet wheel, a pushing lever arranged on one side of the chutes and having portions adapted to enter the same, and a lever G, fulcrumed at one end and having its opposite end connected to the lever F, and also having a plurality of coin-engaging portions at an intermediate point of its length, substantially as and for the purpose set forth.

In testimony whereof I affix my signature in presence of two witnesses.

JOHN HUBERT GREEFKENS.

Witnesses:
LINCOLN SONNTAG,
JAMES A. MOYNA.